US011966191B2

(12) United States Patent
Kurita

(10) Patent No.: US 11,966,191 B2
(45) Date of Patent: Apr. 23, 2024

(54) IMAGE FORMING APPARATUS WITH PARTICULARLY ARRANGED ELECTRIC BOARDS

(71) Applicant: CANON KABUSHIKI KAISHA, Tokyo (JP)

(72) Inventor: Shigeharu Kurita, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/861,548

(22) Filed: Jul. 11, 2022

(65) Prior Publication Data

US 2023/0016030 A1 Jan. 19, 2023

(30) Foreign Application Priority Data

Jul. 15, 2021 (JP) ................................ 2021-117130

(51) Int. Cl.
*G03G 21/16* (2006.01)
*G03G 15/00* (2006.01)

(52) U.S. Cl.
CPC ......... *G03G 21/1652* (2013.01); *G03G 15/80* (2013.01); *G03G 21/1619* (2013.01)

(58) Field of Classification Search
CPC . G03G 21/1652; G03G 15/80; G03G 21/1619
See application file for complete search history.

(56) References Cited

U.S. PATENT DOCUMENTS

2016/0109848 A1* 4/2016 Ohata ................ G03G 21/1619 399/107
2016/0124379 A1* 5/2016 Okumura ........... G03G 21/1633 399/107
2016/0381815 A1* 12/2016 Terakawa .............. G03G 15/80 361/809
2018/0103542 A1* 4/2018 Shinotsuka ........ G03G 21/1652
2021/0271182 A1* 9/2021 Takahashi ............. G03G 15/80

FOREIGN PATENT DOCUMENTS

JP 2007316268 A 12/2007

* cited by examiner

*Primary Examiner* — Sandra Brase
(74) *Attorney, Agent, or Firm* — ROSSI, KIMMS & McDOWELL LLP

(57) ABSTRACT

An image forming apparatus includes a plurality of photosensitive members, a support frame configured to support the plurality of photosensitive members, and an electric unit including a first electric board and a second electric board, and fixed to the support frame. The electric unit includes a first supporting portion extending in an arrangement direction of the plurality of photosensitive members, a second supporting portion extending in the arrangement direction, and a board holding portion configured to hold the first electric board and the second electric board and bridged between the first supporting portion and the second supporting portion. The first electric board is positioned in the image forming apparatus more inward than at least one of the first supporting portion or the second supporting portion in a direction orthogonal to the arrangement direction and a vertical direction.

14 Claims, 11 Drawing Sheets

IMAGE FORMING APPARATUS WITH PARTICULARLY ARRANGED ELECTRIC BOARDS

BACKGROUND OF THE INVENTION

Field of the Invention

The present invention relates to an image forming apparatus such as a printer, a copier, a facsimile machine, and a multifunction peripheral.

Description of the Related Art

An image forming apparatus such as a printer, a copier, a facsimile machine, or a multifunction peripheral includes rotary members related to formation of a toner image, such as a photosensitive drum or a developing sleeve, and a drive unit including a motor, a drive gear, or the like that rotates the rotary members. Further, the image forming apparatus includes, for example, a high-voltage board for applying a high voltage to a charging unit that charges the photosensitive drum, a developing unit that develops a toner image on the photosensitive drum, and the like, a control circuit board that controls the drive unit, and the like (JP 2007-316268 A). Furthermore, the image forming apparatus includes various electric boards such as a control board that performs various types of control processing related to an image forming operation, and a relay board that relays power supplied from an external power supply to the high-voltage board, the control board, and the like.

Hitherto, there is a case where the control circuit board and the high-voltage board are integrally implemented as one unit in order to reduce the size of the image forming apparatus and improve workability at the time of assembly or maintenance. In JP 2007-316268 A, at least a part of the control circuit board that controls the drive unit serving as a drive unit is stacked so as to overlap the high-voltage board.

Recently, for example, an image forming apparatus for commercial printing capable of forming a toner image on more recording materials in a shorter time has been used. For example, the image forming apparatus for commercial printing includes a photosensitive drum, a charging unit, a developing unit, a drive unit, and the like that are larger than those of an apparatus for home printing or office printing, and has a larger number of electric boards such as a board that supplies power to these units and a board that controls each unit as compared with an image forming apparatus for office printing. In such an image forming apparatus for commercial printing, in a case where board arrangement as in JP 2007-316268 A is adopted, there is a possibility that a suitable board arrangement is not necessarily implemented.

SUMMARY OF THE INVENTION

The present invention provides an image forming apparatus that can provide a more appropriate board arrangement, the image forming apparatus including a plurality of electric boards.

One feature of the present invention is an image forming apparatus that forms an image on a recording material, the image forming apparatus including a plurality of photosensitive members, a support frame configured to support the plurality of photosensitive members, and an electric unit including a first electric board and a second electric board, and fixed to the support frame. The electric unit includes a first supporting portion extending in an arrangement direction of the plurality of photosensitive members, a second supporting portion extending in the arrangement direction, and a board holding portion configured to hold the first electric board and the second electric board and bridged between the first supporting portion and the second supporting portion. The first electric board is positioned in the image forming apparatus more inward than at least one of the first supporting portion or the second supporting portion in a direction orthogonal to the arrangement direction and a vertical direction.

Further features of the present invention will become apparent from the following description of exemplary embodiments with reference to the attached drawings.

DESCRIPTION OF THE EMBODIMENTS

Image Forming System

Figure 1:
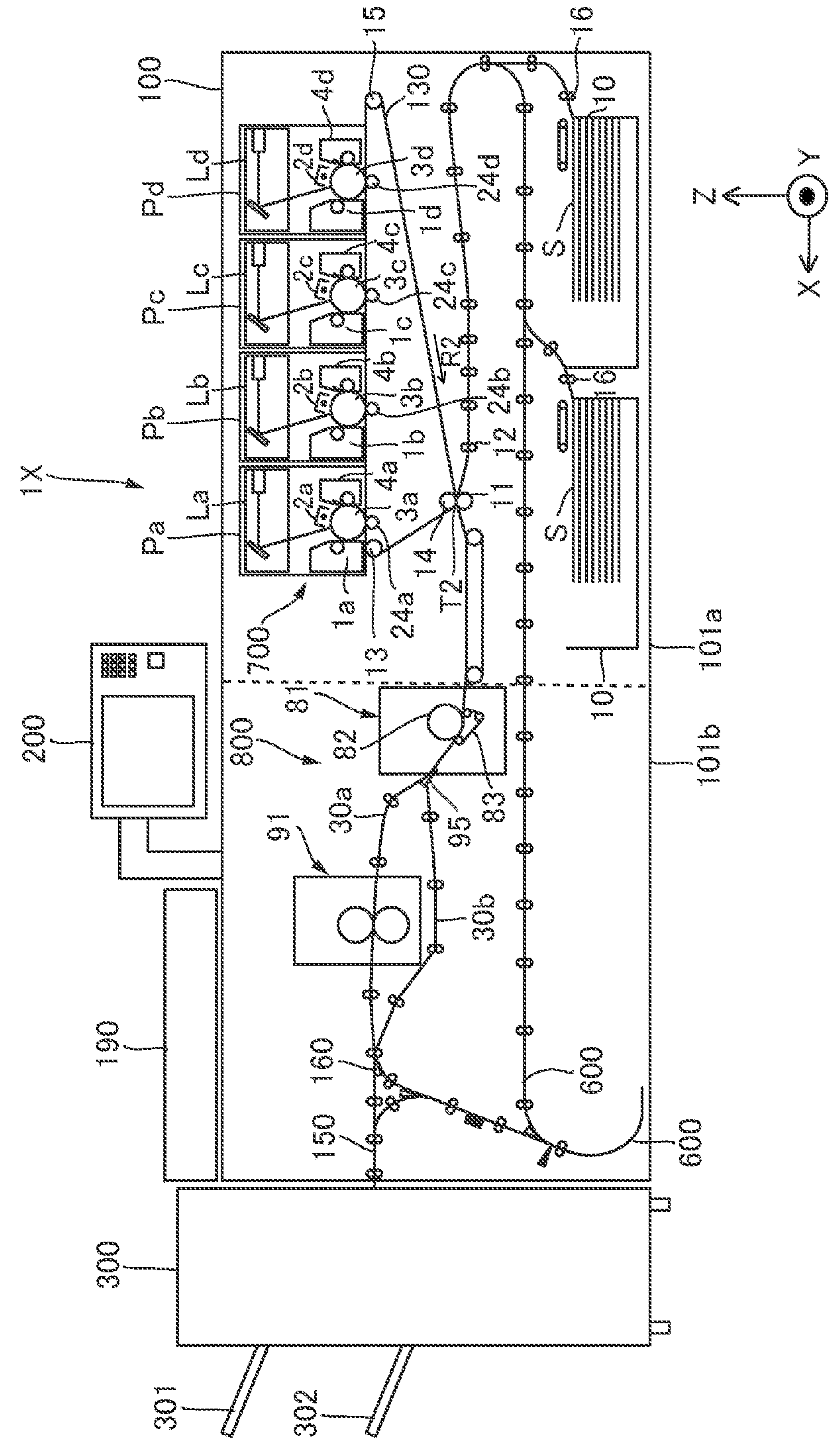
FIG. 1 is a schematic view illustrating an image forming system including an image forming apparatus according to the present embodiment.

A schematic configuration of an image forming system including an image forming apparatus according to the present embodiment will be described with reference to FIGS. 1 to 3. An image forming system 1X illustrated in FIG. 1 includes an image forming apparatus 100 and a finisher apparatus 300. The image forming apparatus 100 and the finisher apparatus 300 are connected so as to be able to transfer a recording material S. In the present embodiment, the finisher apparatus 300 is a post-process unit that can be retrofitted to the image forming apparatus 100 for function enhancement, and can perform a post-process to be described later on the recording material S on which a toner image is fixed by the image forming apparatus 100. The image forming apparatus 100 and the finisher apparatus 300 are connected through an input/output interface so as to be able to transmit and receive data therebetween. Note that the post-process unit is not limited to the finisher apparatus 300.

Image Forming Apparatus

The image forming apparatus 100 is an electrophotographic tandem full-color printer, and forms a toner image on the recording material S according to an image signal received from an external device (not illustrated) such as a document reading apparatus 190 or a personal computer that reads an image signal from a document. The image forming apparatus 100 includes a first casing 101*a*, a second casing 101*b*, and a third casing 101*c* (see FIG. 2). A support frame that supports various devices such as an image forming unit 700 that implements a process of conveying the recording material S and transferring a toner image, various members, and the like is provided inside the first casing 101*a*.

In the present embodiment, image forming sections Pa to Pd, primary transfer rollers 24*a* to 24*d*, an intermediate transfer belt 130, a plurality of rollers 13 to 15, and an outer secondary transfer roller 11 to be described later are included in the image forming unit 700 that forms a toner image on the recording material S. Examples of the recording material S include paper sheets such as a plain paper sheet, a thick paper sheet, a rough paper sheet, an uneven paper sheet, and a coated paper sheet, a plastic film, cloth, and the like.

Meanwhile, various devices and various members such as a fixing unit 800 that implements a process of conveying the recording material S and fixing a toner image are arranged in the second casing 101*b*. A display unit capable of displaying various types of information and an operation unit 200 including a key capable of inputting various types of information according to an operation of an operator, and the like are arranged on the front surface side of the second casing 101*b*. Note that, in the present specification, a side on which an operator stands when operating the operation unit 200 to operate the image forming apparatus 100 is referred to as a "front surface", and a side opposite to the front surface is referred to as a "back surface".

Figure 2:
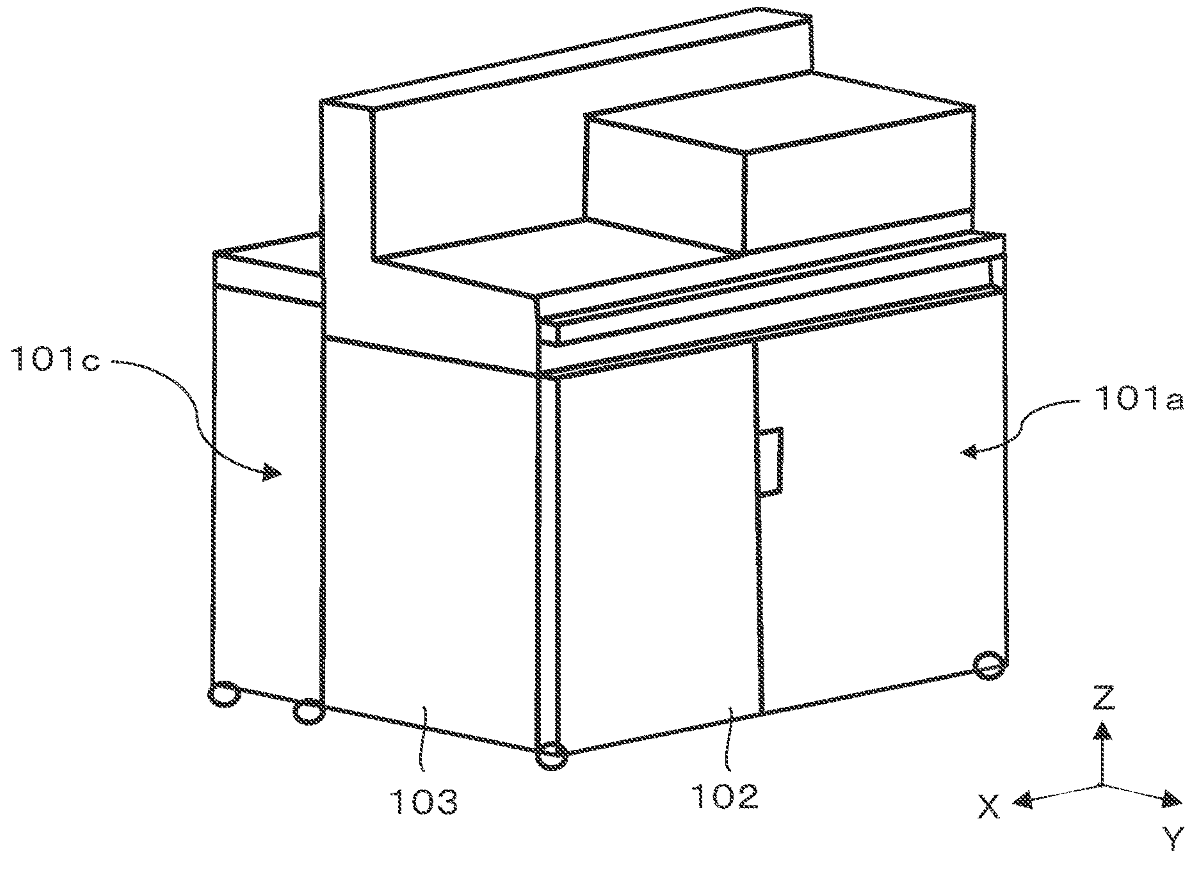
FIG. 2 is a perspective view illustrating the image forming apparatus.

As illustrated in FIG. 1, the image forming apparatus 100 includes the image forming sections Pa, Pb, Pc, and Pd that form yellow, magenta, cyan, and black images. The image forming sections Pa to Pd are supported on the support frame in the first casing 101*a* so as to be aligned in a moving direction of the intermediate transfer belt 130. Note that the image forming sections Pa, Pb, Pc, and Pd are arranged so as to be aligned in a width direction of the image forming apparatus 100. In other words, photosensitive drums 3*a* to 3*d* provided in the image forming sections Pa, Pb, Pc, and Pd, respectively, are arranged in the width direction of the image forming apparatus 100. In the present embodiment, an arrangement direction of the photosensitive drums 3*a* to 3*d* is the width direction of the image forming apparatus 100. The intermediate transfer belt 130 is stretched around a plurality of rollers (13, 14, and 15) and moved in an arrow R2 direction. Then, the intermediate transfer belt 130 carries and conveys a toner image to be primarily transferred as described later. The outer secondary transfer roller 11 is arranged so as to face an inner secondary transfer roller 14 around which the intermediate transfer belt 130 is stretched with the intermediate transfer belt 130 interposed therebetween, and a secondary transfer portion T2 that transfers a toner image on the intermediate transfer belt 130 to the recording material S. The fixing unit 800 is arranged downstream of the secondary transfer portion T2 in a recording material conveyance direction (arrow X direction: width direction).

A plurality of cassettes 10 (here, two cassettes 10) in which the recording materials S are accommodated are arranged on the lower side of the image forming apparatus 100. The recording materials S having different sizes and thicknesses are accommodated in these cassettes 10, and the recording material S is selectively conveyed from one of the cassettes 10. The recording material S is conveyed from the cassette 10 toward a registration roller 12 through a conveying path by a conveying roller 16. Thereafter, the registration roller 12 rotates in synchronization with the toner image formed on the intermediate transfer belt 130, whereby the recording material S is conveyed toward the secondary transfer portion T2. Note that the recording material S is not limited to the recording material S stored in the cassette 10, and the recording material S loaded on a manual sheet feed portion (not illustrated) may be conveyed.

The image forming sections Pa, Pb, Pc, and Pd have substantially the same configuration except that toner image developing colors are different. Therefore, here, the yellow image forming section Pa will be described as a representative, and a description of the other image forming sections Pb, Pc, and Pd will be omitted.

In the image forming section Pa, the cylindrical photosensitive drum 3*a* is arranged as a photosensitive member. The photosensitive drum 3*a* rotates by a motor (not illustrated). A charging device 2*a* serving as a charging unit, an exposing device La, a developing device 1*a*, a primary transfer roller 24*a*, and a drum cleaning device 4*a* are arranged around the photosensitive drum 3*a*.

For example, a process of forming a full-color image by the image forming apparatus 100 will be described. First, once an image forming operation is started, the surface of the rotating photosensitive drum 3*a* is uniformly charged by the charging device 2*a*. The charging device 2*a* is, for example, a corona charger that radiates charge particles associated with corona discharge according to application of a charging voltage to charge the surface of the photosensitive drum 3*a* to a uniform potential. Next, the photosensitive drum 3*a* is scanned and exposed by laser light corresponding to an image signal emitted from the exposure device La. As a result, an electrostatic latent image corresponding to the image signal is formed on the surface of the photosensitive drum 3*a*. The electrostatic latent image formed on the photosensitive drum 3*a* is developed into a toner image that is a visible image by a developer containing toner and a carrier stored in the developing device 1*a*. In other words, the toner image is developed on the photosensitive drum 3*a* by the toner supplied by the developing device 1*a*. In the developing device 1*a*, the developer is circularly conveyed while being stirred by a conveying screw (not illustrated), and the toner of the developer is supplied to the photosensitive drum 3*a* via a developing sleeve (not illustrated) in accordance with the application of the developing voltage.

The toner image formed on the photosensitive drum 3*a* is primarily transferred to the intermediate transfer belt 130 at a primary transfer portion T1 formed between the primary transfer roller 24*a* and the photosensitive drum 3*a* arranged with the intermediate transfer belt 130 interposed therebetween. At this time, a primary transfer voltage is applied to the primary transfer roller 24*a*. The toner remaining on the surface of the photosensitive drum 3*a* after the primary transfer is removed by the drum cleaning device 4*a*.

Such an operation is sequentially performed in the yellow, magenta, cyan, and black image forming sections Pa to Pd, and toner images of four colors are superimposed on the intermediate transfer belt 130. Thereafter, the recording material S accommodated in the cassette 10 is conveyed to the secondary transfer portion T2 in accordance with a toner image formation timing. Then, as a secondary transfer voltage is applied to the outer secondary transfer roller 11, the full-color toner image formed on the intermediate transfer belt 130 is secondarily transferred collectively to the recording material S. The toner remaining on the intermediate transfer belt 130 after the secondary transfer is removed by a belt cleaning device (not illustrated).

The recording material S to which the toner image has been transferred is conveyed to the fixing unit 800. The fixing unit 800 fixes the toner image on the recording material S by applying heat and pressure to the recording material S to which the toner image has been transferred. In the present embodiment, it is possible to selectively apply heat and pressure to the recording material S by a first fixer 81 and then further apply heat and pressure by a second fixer 91. In the fixing unit 800, whether to convey the recording material S toward the second fixer 91 after passing through the first fixer 81 or to convey the recording material S while avoiding the second fixer 91 after passing through the first fixer 81 is switched by a fixing switching flapper 95.

The second fixer 91 is arranged downstream of the first fixer 81 in the conveyance direction of the recording material S. The second fixer 91 is selectively used for the purpose of further adding gloss to the toner image on the recording material S fixed by the first fixer 81. For example, in a case where the recording material S is a coated paper sheet such as a glossy paper sheet or a synthetic paper sheet, the recording material S having passed through the first fixer 81 is conveyed along a fixing route 30*a* so that fixing is performed by both the first fixer 81 and the second fixer 91. On the other hand, in a case where the recording material S is a non-coated paper sheet such as a plain paper sheet, the recording material S having passed through the first fixer 81 is conveyed along a fixing bypass route 30*b* to avoid the second fixer 91 so that the fixing is not performed in the second fixer 91 while the fixing is performed in the first fixer 81.

The first fixer 81 and the second fixer 91 may have the same configuration, and here, the first fixer 81 will be described as an example. The first fixer 81 includes a fixing roller 82 (or a fixing belt) that is rotatable by coming into contact with a surface of the recording material S on which the toner image is fixed, and a pressure belt 83 (or a pressure roller) that is in pressure-contact with the fixing roller 82 to form a fixing nip portion. At least one of the fixing roller 82 or the pressure belt 83 is heated by a heater (not illustrated). The first fixer 81 applies heat and pressure to the recording material S at the time of nipping and conveying the recording material S on which the toner image is formed at the fixing nip portion formed by the fixing roller 82 and the pressure belt 83 to fix the toner image on the recording material S.

In the present embodiment, the image forming apparatus 100 can perform double-sided printing. In a case of single-sided printing, the recording material S on which the toner image is fixed is conveyed to a discharge conveyance path 150 and discharged to the outside of the image forming apparatus 100. In a case of double-sided printing, the recording material S on which the toner image is fixed is conveyed to a reversing conveyance path 600. The reversing conveyance path 600 is formed across the first casing 101*a* and the second casing 101*b*. In the reversing conveyance path 600, the recording material S is reversed by a switch-back operation, and the front surface and the back surface of the recording material S are reversed. The reversed recording material S is conveyed toward the registration roller 12, and is conveyed to the secondary transfer portion T2 by the registration roller 12 in a state where the back surface that has not been subjected to printing faces the intermediate transfer belt 130. In the secondary transfer portion T2, the full-color toner image formed on the intermediate transfer belt 130 is secondarily transferred collectively to the recording material S (back surface). Thereafter, the toner image is fixed by the fixing unit 800, and the recording material S is discharged to the outside of the image forming apparatus 100 in a state where the surface (image forming surface) on which the image has been formed immediately before faces upward. The switching between the discharge conveyance path 150 and the reversing conveyance path 600 described above is performed by a conveyance switching flapper 160.

The finisher apparatus 300 is connected to the image forming apparatus 100 so as to be able to transfer the recording material S, and the recording material S discharged from the image forming apparatus 100 is conveyed to the finisher apparatus 300. The recording material S conveyed to the finisher apparatus 300 undergoes a post-process such as a punching process of making a hole in the recording material S by the finisher apparatus 300 or a stapling process of bundling and stapling a plurality of recording materials S. In the finisher apparatus 300, the holed recording material S is separately discharged to an upper sheet discharge tray 301, and a bundle of the stapled recording materials S is separately discharged to a lower sheet discharge tray 302.

The support frame provided in the first casing 101*a* includes a plurality of sheet metal members such as a front plate provided on the front surface side, a rear plate 211 (see FIGS. 4 and 6 to be described later) provided on the back surface side and supporting the image forming sections Pa to Pd together with the front plate, a stay connecting the front plate and the rear plate, and a support column supporting the rear plate. As illustrated in FIG. 2, the first casing 101*a* is configured such that the support frame is covered with an exterior cover constituting the external appearance of the image forming apparatus 100, such as a front cover 102 arranged on the front surface and side covers 103 arranged on the left and right side surfaces. In the present embodiment, the front-rear direction of the image forming apparatus 100 is indicated by an arrow Y direction in the drawing, the vertical direction is indicated by an arrow Z direction in the drawing, and the width direction orthogonal to the front-rear direction and the vertical direction is indicated by the arrow X direction in the drawing.

However, the back surface side of the first casing 101*a* is not covered with the exterior cover. Therefore, as illustrated in FIG. 2, in the present embodiment, the third casing 101*c* is arranged on the back surface side of the first casing 101*a* so as to cover the back surface instead of the exterior cover. The third casing 101*c* is covered with an exterior cover except for a surface side facing the back surface of the first casing 101*a*, so that an electric unit 50 (see FIG. 4) to be described later provided on the back surface side of the first casing 101*a* is not visible from the outside in a state of being mounted on the first casing 101*a*. The third casing 101*c* is attachable to and detachable from the first casing 101*a* with a screw or the like (not illustrated).

Figure 3:
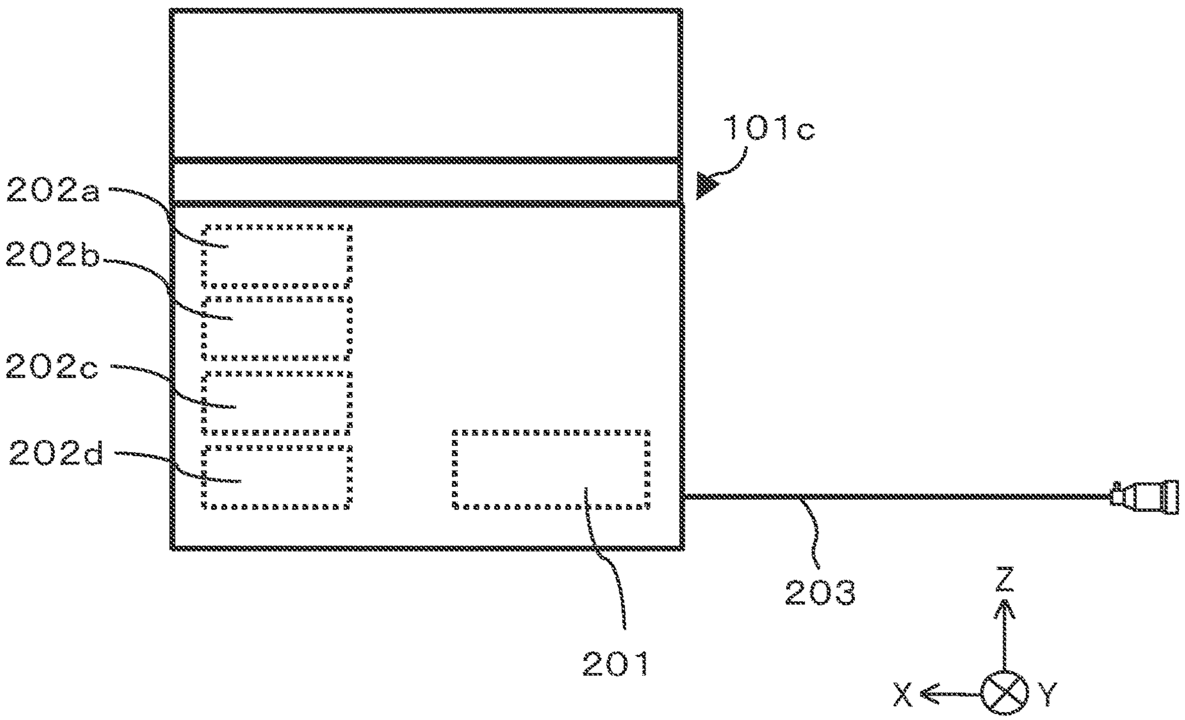
FIG. 3 is a rear view illustrating the image forming apparatus.

As illustrated in FIG. 3, a main power supply cord base 201 and a plurality of DC power supply units 202*a*, 202*b*, 202*c*, and 202*d* are provided in the third casing 101*c*. The main power supply cord base 201 includes an electric filter, a relay, and the like (not illustrated), and converts an AC voltage obtained from an external AC power supply into a DC voltage through an external power cable 203 connected to an external power supply by the electric filter, the relay, and the like. The DC voltage obtained by the conversion is supplied from the main power supply cord base 201 to each of the plurality of DC power supply units 202*a* to 202*d*.

The DC power supply units 202*a* to 202*d* adjust a DC voltage supplied from the main power supply cord base 201 and supply the adjusted DC voltage to the electric unit 50 (see FIG. 4) described later in order to operate various electric drivers (for example, the developing devices 1*a* to 1*d*) provided in the image forming apparatus 100. In the image forming apparatus 100 for commercial printing, since a printing speed is faster than that of an image forming apparatus for home printing, a high-power and large-capacity power supply device is required. However, in consideration of the fact that such a power supply device has a large size and ease of maintenance, in the present embodiment, power supply devices such as the main power supply cord base 201 and the DC power supply units 202*a* to 202*d* are integrated in the third casing 101*c*. In other words, the third casing 101*c* is a power supply apparatus in which the power supply devices are housed.

In the present embodiment, when the image forming apparatus 100 is assembled, a large number of electric boards are arranged on the back surface side of the first casing 101*a* before the third casing 101*c* is attached to the first casing 101*a*. The electric board is a board on which, for example, a CPU, a memory, an electronic component, an electric component, a connector, and the like are mounted. Examples of the electric board include a control board that executes a program such as an image forming job and transmits and receives an image signal and various control signals, and a plurality of high-voltage developing boards that apply a developing voltage to the developing devices 1*a* to 1*d*. Examples of the electric board further include a relay board that relays the DC voltage supplied from the DC power supply units 202*a* to 202*d* and supplies the DC voltage to the control board and the high-voltage developing board.

The control board, the high-voltage developing board, and the relay board are electrically connected so as to be able to transmit and receive an electric signal. The electric board is not limited to the one described above. For example, the electric board may be a high-voltage circuit board that applies a charging voltage to the charging devices 2*a* to 2*d*, a drive board that drives a drive unit (not illustrated) including a motor that rotates rotary members such as the photosensitive drums 3*a* to 3*d* (first and second photosensitive members), a drive gear, or the like.

However, in a case of the image forming apparatus 100 for commercial printing as illustrated in FIG. 1, each of the image forming sections Pa to Pd is larger than that of the apparatus for home printing or office printing, and the number of various units included in the image forming apparatus 100 including the electric board as described above is large. When assembling such an image forming apparatus 100, for example, in a case where a plurality of high-voltage developing boards (here, four high-voltage developing boards) are individually arranged corresponding to the developing devices 1*a* to 1*d*, respectively, the number of times the work of arranging the high-voltage developing boards is performed increases, and as a result, it takes time to assemble the image forming apparatus 100.

Therefore, in the present embodiment, the time required for arranging the electric boards can be shortened when assembling the image forming apparatus 100. Hereinafter, a configuration of the present embodiment for reducing a time required for arranging the electric boards will be described by using FIGS. 4 to 11 while referring to FIGS. 1, 2, and 3. Note that, in the following, the high-voltage developing boards that apply a developing voltage to the developing devices 1*a* to 1*d* will be described as an example of the high-voltage circuit boards for easy understanding of the description. In FIG. 5, only two mounting screws 61 to be described later are illustrated for convenience of illustration.

Figure 4:
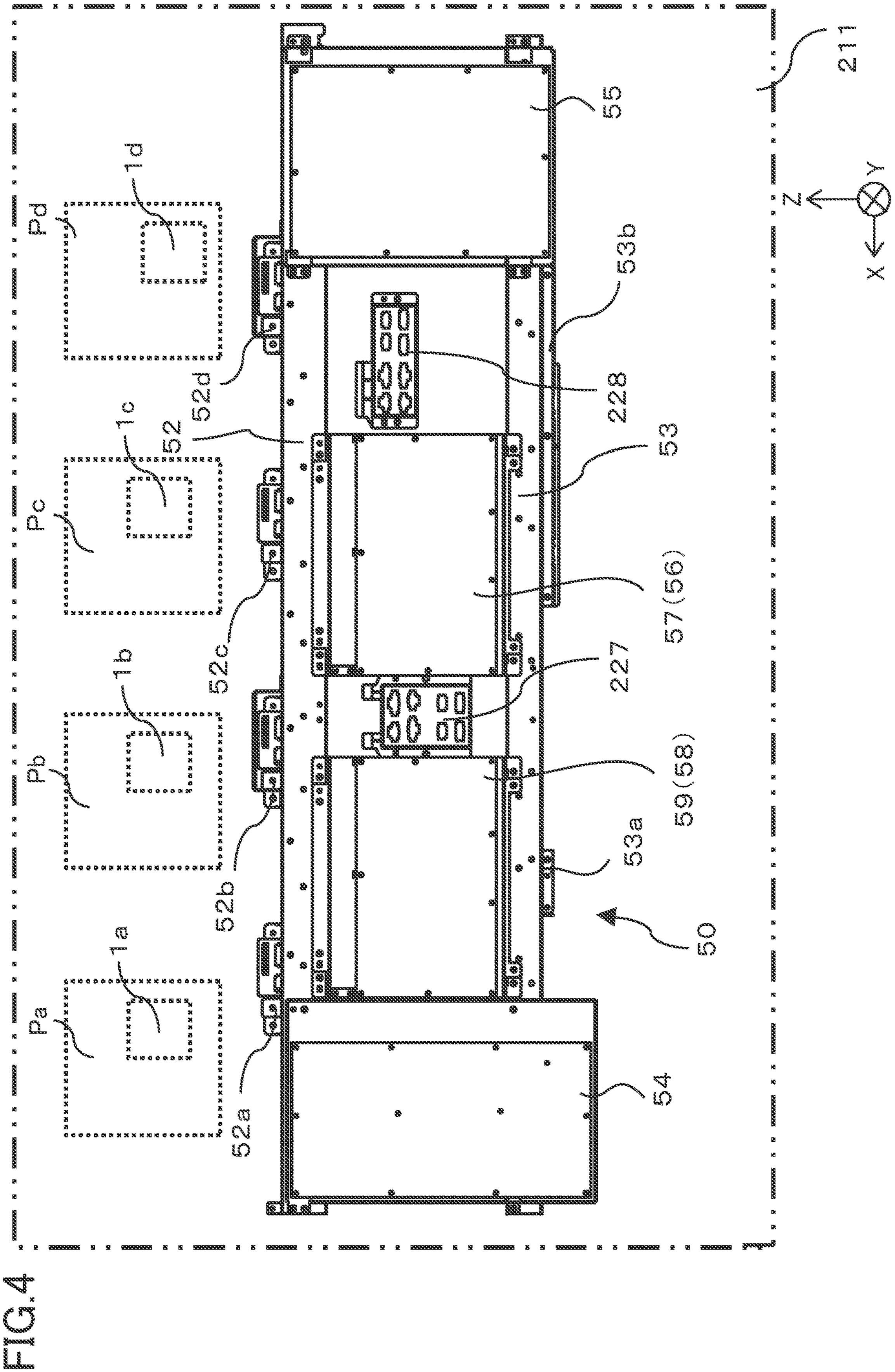
FIG. 4 is a schematic view illustrating a back surface of the image forming apparatus before a third casing is attached.
Figure 5:
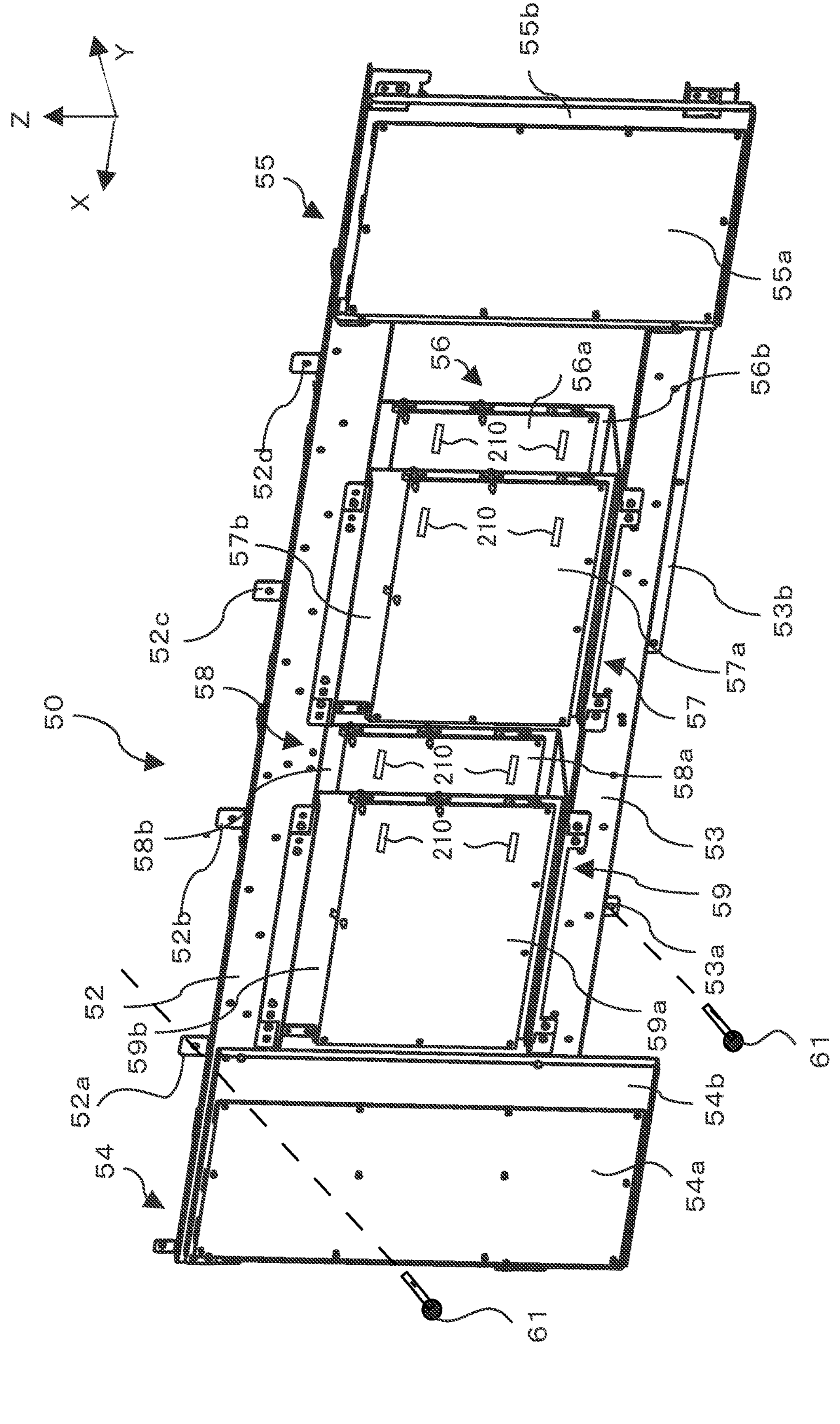
FIG. 5 is a perspective view illustrating an electric unit of the present embodiment.

FIG. 4 is a rear view illustrating the image forming apparatus 100 before the third casing 101*c* is attached to the first casing 101*a*. FIG. 5 is a perspective view illustrating the electric unit 50. The rear plate 211 made of sheet metal and formed in substantially the same size as the first casing 101*a* is attached to the back surface of the image forming apparatus 100. The electric unit 50 is detachably provided on the rear plate 211 by the mounting screw 61 (see FIG. 5). The electric unit 50 includes an upper stay 52 serving as a first supporting portion, a lower stay 53 serving as a second supporting portion, a relay board unit 54, a control board unit 55, and a plurality of high-voltage developing board units (here, four high-voltage developing board units) 56, 57, 58, and 59.

As illustrated in FIG. 5, the relay board unit 54 includes a relay board 54*a* and a relay support plate 54*b*, and the relay board 54*a* is fixed to the relay support plate 54*b* made of sheet metal and serving as a third holding portion by a screw (not illustrated). The relay board 54*a* serving as a third board has a function of relaying the DC voltage supplied from the above-described DC power supply units 202*a* to 202*d* (see FIG. 3) to a control board 55*a* and high-voltage developing boards 56*a*, 57*a*, 58*a*, and 59*a*. Therefore, a connector (not illustrated) for attaching and detaching a cable electrically connected to the DC power supply units 202*a* to 202*d* is mounted on the relay board 54*a*. A connector (not illustrated) for attaching and detaching a cable electrically connected to the control board 55*a* and the high-voltage developing boards 56*a* to 59*a* is mounted on the relay board 54*a*.

The control board unit 55 includes the control board 55*a* and a control support plate 55*b*, and the control board 55*a* is fixed to the control support plate 55*b* made of sheet metal and serving as a fourth holding portion by a screw (not illustrated). The control board 55*a* serving as a fourth board has a function of transmitting and receiving various control signals to and from the relay board 54*a* and the high-voltage developing boards 56*a* to 59*a*. Therefore, a connector (not illustrated) for attaching and detaching a cable electrically connected to the relay board 54*a* and the high-voltage developing boards 56*a* to 59*a* is mounted on the control board 55*a*. A connector for attaching and detaching a cable electrically connected to an electric driver such as a motor or a temperature sensor (not illustrated) may be mounted on the control board 55*a*.

The high-voltage developing board units 56 to 59 include the high-voltage developing boards 56*a* to 59*a* and high-voltage developing support plates 56*b* to 59*b*, and the high-voltage developing boards 56*a* to 59*a* are fixed to the high-voltage developing support plates 56*b* to 59*b* made of a plate metal and serving as board holding portions (a first holding portion, a second holding portion, the third holding portion, the fourth holding portion, and other board holding portion) by screws not illustrated. The high-voltage developing boards 56*a* to 59*a* serving as a first board or a second board (a fifth board or a sixth board) are high-voltage boards having a function of applying a developing voltage to the yellow, magenta, cyan, and black developing devices la to 1*d* (a first developing unit and a second developing unit). That is, the high-voltage developing boards 56*a* to 59*a* adjust the DC voltage supplied from the DC power supply units 202*a* to 202*d* to a desired voltage value according to a control signal of the control board 55*a*, and apply the developing voltage to the developing devices la to 1*d*. Therefore, connectors 210 for attaching and detaching cables electrically connected to the DC power supply units

202*a* to 202*d* and the control board 55*a* are mounted on the high-voltage developing boards 56*a* to 59*a*. The high-voltage developing boards 56*a* to 59*a* may be boards having the same shape and the same function.

The upper stay 52 and the lower stay 53 are, for example, long sheet metal members with a U-shaped cross section. The relay support plate 54*b*, the control support plate 55*b*, and the high-voltage developing support plates 56*b* to 59*b* described above are detachably provided by support plate fixing screws 62*a* and 62*b* with respect to the upper stay 52 and the lower stay 53 extending in parallel (see FIGS. 7 to 9 described later).

As illustrated in FIG. 4, the relay board unit 54, the high-voltage developing board unit 59 (58), the high-voltage developing board unit 57 (56), and the control board unit 55 are arranged side by side in the longitudinal direction (width direction: arrow X direction) of the long upper stay 52 and lower stay 53. The relay board unit 54 is arranged on a first end side in the longitudinal direction, the control board unit 55 is arranged on a second end side in the longitudinal direction, and the high-voltage developing board unit 59 (58) and the high-voltage developing board unit 57 (56) are arranged between the relay support plate 54*b* and the control support plate 55*b* in the longitudinal direction. In other words, in the present embodiment, the high-voltage developing support plates 56*b* to 59*b* are attached to a structure formed by connecting the upper stay 52 and the lower stay 53 by the relay support plate 54*b* and the control support plate 55*b*. In the present embodiment, the relay board unit 54, the high-voltage developing board unit 59 (58), the high-voltage developing board unit 57 (56), and the control board unit 55 are attached to the upper stay 52 and the lower stay 53 so as to face the rear plate 211.

However, the relay board unit 54, the high-voltage developing board unit 59 (58), the high-voltage developing board unit 57 (56), and the control board unit 55 are arranged at predetermined intervals in a part in the longitudinal direction. This is because relay connectors 227 and 228 for attaching and detaching cables (not illustrated) for electrically connecting the high-voltage developing boards 56*a* to 59*a* and the developing devices la to 1*d* are provided on the rear plate 211 to prevent the relay connectors 227 and 228 from being hidden by the electric unit 50. Accordingly, after the electric unit 50 is mounted on the rear plate 211, the high-voltage developing boards 56*a* to 59*a* and the developing devices la to 1*d* can be electrically connected by the cables.

The relay board unit 54, the high-voltage developing board unit 59 (58), the high-voltage developing board unit 57 (56), and the control board unit 55 are arranged on the upper stay 52 and the lower stay 53 in a state where the relay board 54*a*, the control board 55*a*, and the high-voltage developing boards 56*a* to 59*a* are fixed to the relay support plate 54*b*, the control support plate 55*b*, and the high-voltage developing support plates 56*b* to 59*b* in advance. That is, the boards (54*a*, 55*a*, and 56*a* to 59*a*) are arranged on the upper stay 52 and the lower stay 53 in a state of being held by the support plates (54*b*, 55*b*, and 56*b* to 59*b*) having higher stiffness than those of the boards. Accordingly, an operator can easily attach and detach the relay board unit 54, the control board unit 55, and the high-voltage developing board units 56 to 59. In addition, a tool or the like used for attaching and detaching these units is less likely to hit the boards (54*a*, 55*a*, and 56*a* to 59*a*), so that it is possible to suppress damage to the boards (54*a*, 55*a*, and 56*a* to 59*a*) due to the hitting of the tool or the like.

The electric unit 50 formed as one structure by the upper stay 52, the lower stay 53, the relay support plate 54*b*, and the control support plate 55*b* is attached to the rear plate 211 by the mounting screw 61 via the high-voltage developing support plates 56*b* to 59*b*, the upper stay 52, and the lower stay 53. That is, as illustrated in FIG. 5, the upper stay 52 has fastening portions 52*a*, 52*b*, 52*c*, and 52*d* serving as first flange portions formed with through holes in which the mounting screws 61 for fixing to the rear plate 211 can be fastened. Note that an insertion direction of the mounting screw 61 is a front-rear direction (depth direction) of the image forming apparatus 100. The lower stay 53 has fastening portions 53*a* and 53*b* formed with through holes in which the mounting screws 61 for fixing to the rear plate 211 can be fastened. The electric unit 50 is arranged such that the longitudinal direction of the long upper stay 52 and the long lower stay 53 is substantially the same as the arrangement direction of the image forming sections Pa, Pb, Pc, and Pd, and is attached to the rear plate 211 by the mounting screw 61. The fastening portions 52*a* to 52*d* and the fastening portions 53*a* and 53*b* are provided in the upper stay 52 and the lower stay 53 so as to protrude toward an outer side opposite to an inner side on which the relay support plate 54*b*, the control support plate 55*b*, and the high-voltage developing support plates 56*b* to 59*b* are attached.

Figure 6:
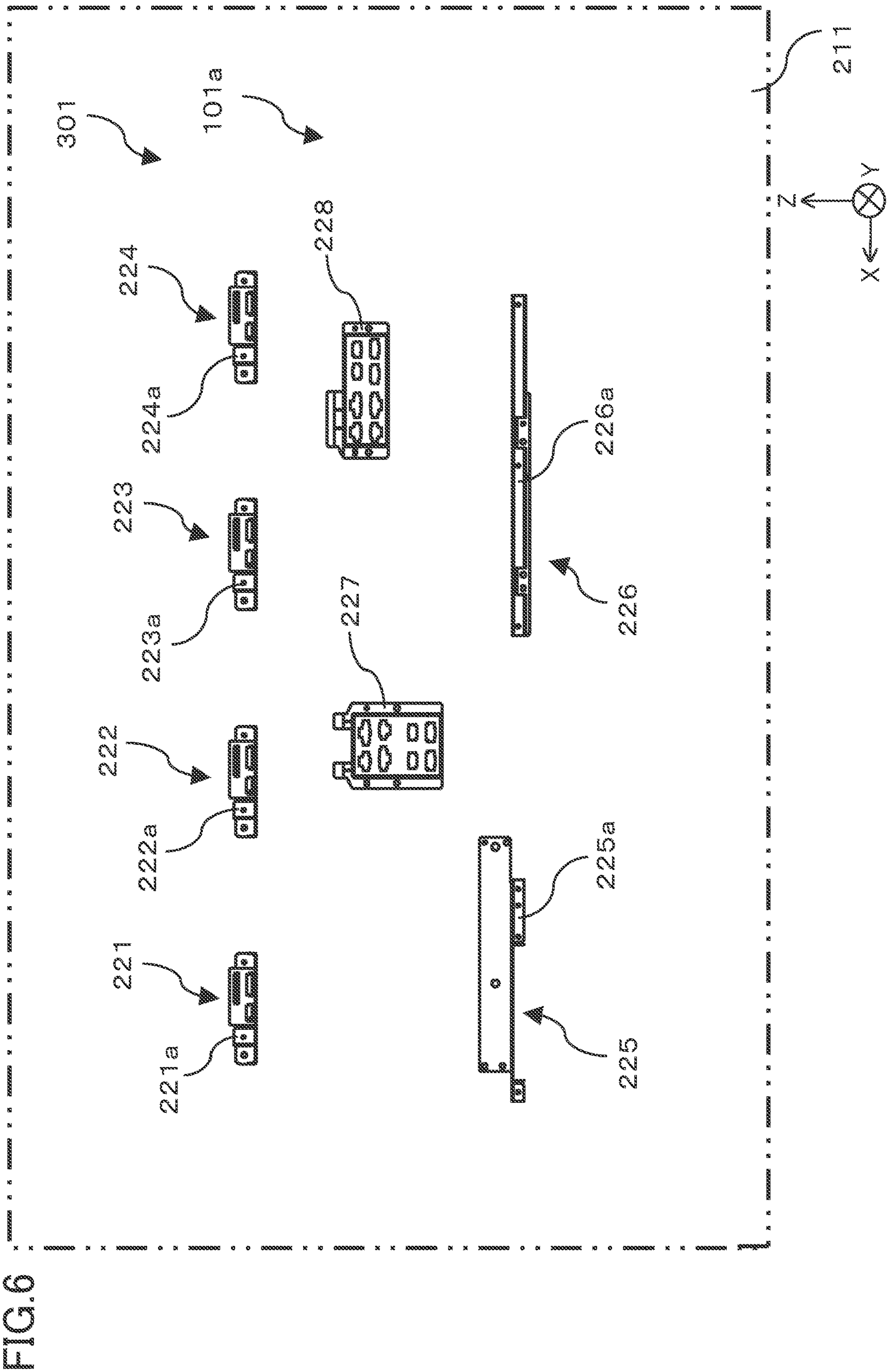
FIG. 6 is a conceptual diagram illustrating an attaching plate for attaching the electric unit.

As illustrated in FIG. 6, the rear plate 211 is provided with upper attaching plates 221, 222, 223, and 224 made of sheet metal and lower attaching plates 225 and 226 made of sheet metal. Attaching portions 221*a*, 222*a*, 223*a*, and 224*a* to which the mounting screws 61 (see FIG. 5) are attached are formed in the upper attaching plates 221 to 224. Further, attaching portions 225*a* and 226*a* to which the mounting screws 61 are attached are formed in the lower attaching plates 225 and 226. As described above, the fastening portions 52*a*, 52*b*, 52*c*, and 52*d* are formed in the upper stay 52, and the fastening portions 53*a* and 53*b* are formed in the lower stay 53 (see FIG. 5). The upper stay 52 is attached to the rear plate 211 by fastening the fastening portions 52*a* to 52*d* and the attaching portions 221*a* to 224*a* of the upper attaching plates 221 to 224 with the mounting screws 61. The lower stay 53 is attached to the rear plate 211 by fastening the fastening portions 53*a* and 53*b* to the attaching portions 225*a* and 226*a* of the lower attaching plates 225 and 226 with the mounting screws 61.

In this way, since the electric unit 50 is mounted on the rear plate 211 via the upper stay 52 and the lower stay 53, the relay board unit 54, the control board unit 55, and the high-voltage developing board units 56 to 59 fixed to the upper stay 52 and the lower stay 53 are integrally attached. Thus, an operator can simultaneously mount a large number of electric boards by mounting the electric unit 50.

In the present embodiment, the relay board unit 54, the control board unit 55, and the high-voltage developing board units 56 to 59 are arranged so as to be aligned in the arrangement direction of the image forming sections Pa, Pb, Pc, and Pd with respect to the upper stay 52 and the lower stay 53. The relay board unit 54, the control board unit 55, and the high-voltage developing board units 56 to 59, which are functions different from each other, are arranged such that the respective support plates do not overlap each other when the image forming apparatus 100 is viewed from the back surface side (arrow Y direction). As a result, the relay board unit 54, the control board unit 55, and the high-voltage developing board units 56 to 59 can be individually attached to and detached from the electric unit 50 in a state where the electric unit 50 is attached to the rear plate 211.

However, in the present embodiment, among the high-voltage developing board units 56 to 59, the high-voltage developing board units 56 and 57 that apply the developing voltages to the yellow and magenta developing devices la and lb are combined in multiple layers and attached to the upper stay 52 and the lower stay 53. In addition, the high-voltage developing board units 58 and 59 that apply the developing voltages to the cyan and black developing devices 1*c* and 1*d* are combined in multiple layers and attached to the upper stay 52 and the lower stay 53. The high-voltage developing board units 56 to 59 have the same function except that the colors of the toners of the developing devices 1*a* to 1*d* to which the developing voltages are to be applied are different. Therefore, in the electric unit 50, the high-voltage developing board units 56 to 59 having the same function have a multilayer structure in which the respective support plates are arranged so as to overlap each other when the image forming apparatus 100 is viewed from the back surface side (arrow Y direction).

This is mainly due to the following reasons. The high-voltage developing boards 56*a* to 59*a* for controlling a high voltage are large in size, and accordingly, the high-voltage developing board units 56 to 59 are also large in size. In a case where such high-voltage developing board units 56 to 59 are simply arranged side by side, the electric unit 50 itself becomes large. Due to such a size of the electric unit 50, it may be necessary to increase the size of the image forming apparatus 100 in order to secure an installation space, but this goes against the recent demand for miniaturization even for commercial printing. Therefore, in order to prevent an increase in size of the image forming apparatus 100 by suppressing an increase in space for installing the electric unit 50, the high-voltage developing board units 56 to 59 are appropriately combined in multiple layers and attached to the upper stay 52 and the lower stay 53. The high-voltage developing board units 56 and 58 are fixed so as to be positioned inside the first casing 101*a* with respect to the upper stay 52 and the lower stay 53. As a result, an increase in size of the first casing 101*a* in the depth direction (arrow Y direction) is suppressed.

In the present embodiment, in order to implement the above-described multilayer structure, the high-voltage developing board units 56 and 58 for yellow and cyan arranged on the back side have the same configuration, and the high-voltage developing board units 57 and 59 for magenta and black arranged on the front side have the same configuration. Therefore, as representative examples, FIG. 7 illustrates the high-voltage developing board unit 57 for magenta, FIG. 8 illustrates the high-voltage developing board unit 56 for yellow, and FIG. 9 illustrates a multilayer structure in which the high-voltage developing board units 57 and 56 are combined.

Figure 9:
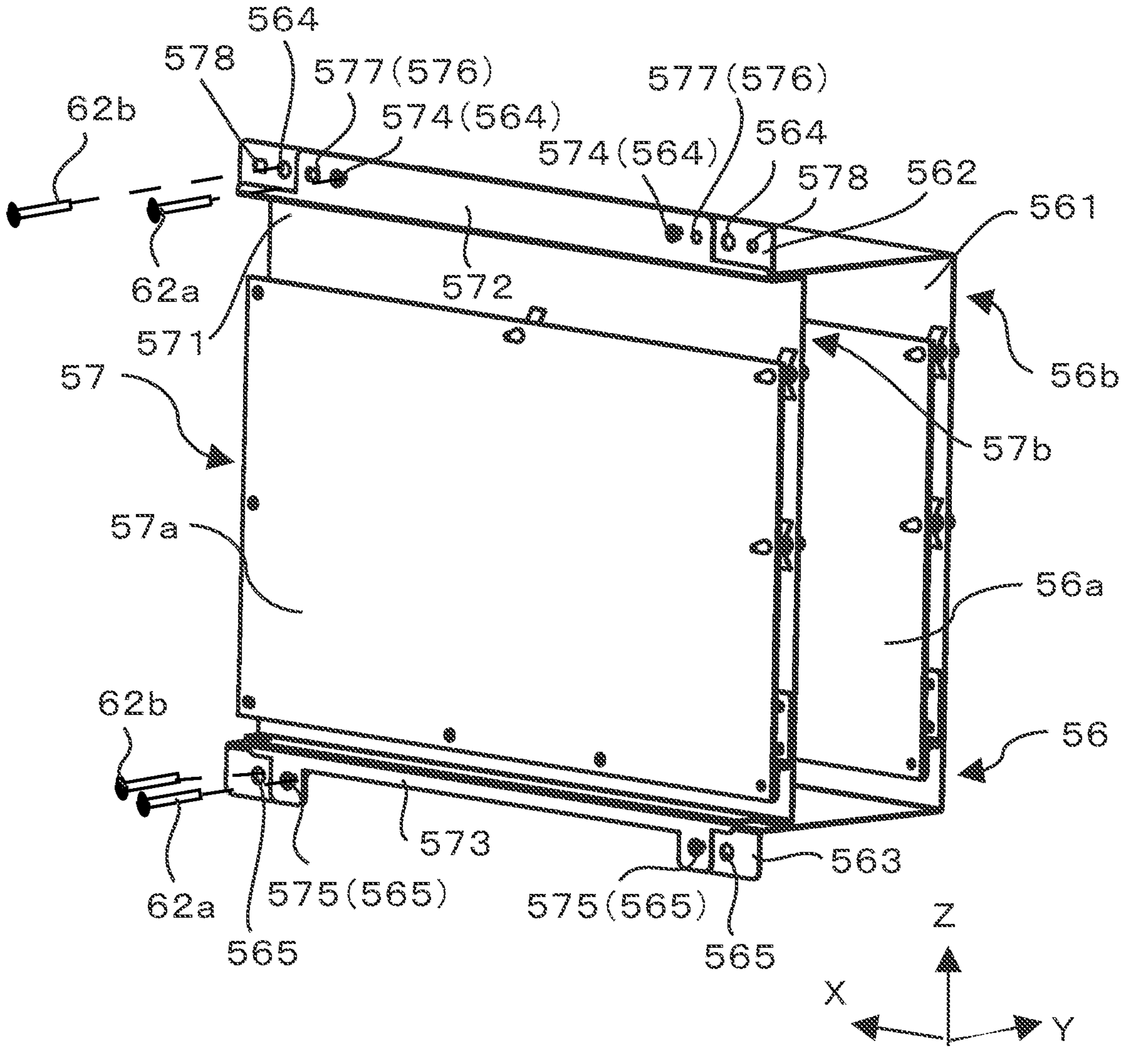
FIG. 9 is a perspective view illustrating a multilayer structure of the high-voltage developing board units.

In FIG. 9, the support plate fixing screws 62*a* and 62*b* are illustrated only on the left side in order to make the drawing easy to see.

Figure 7:
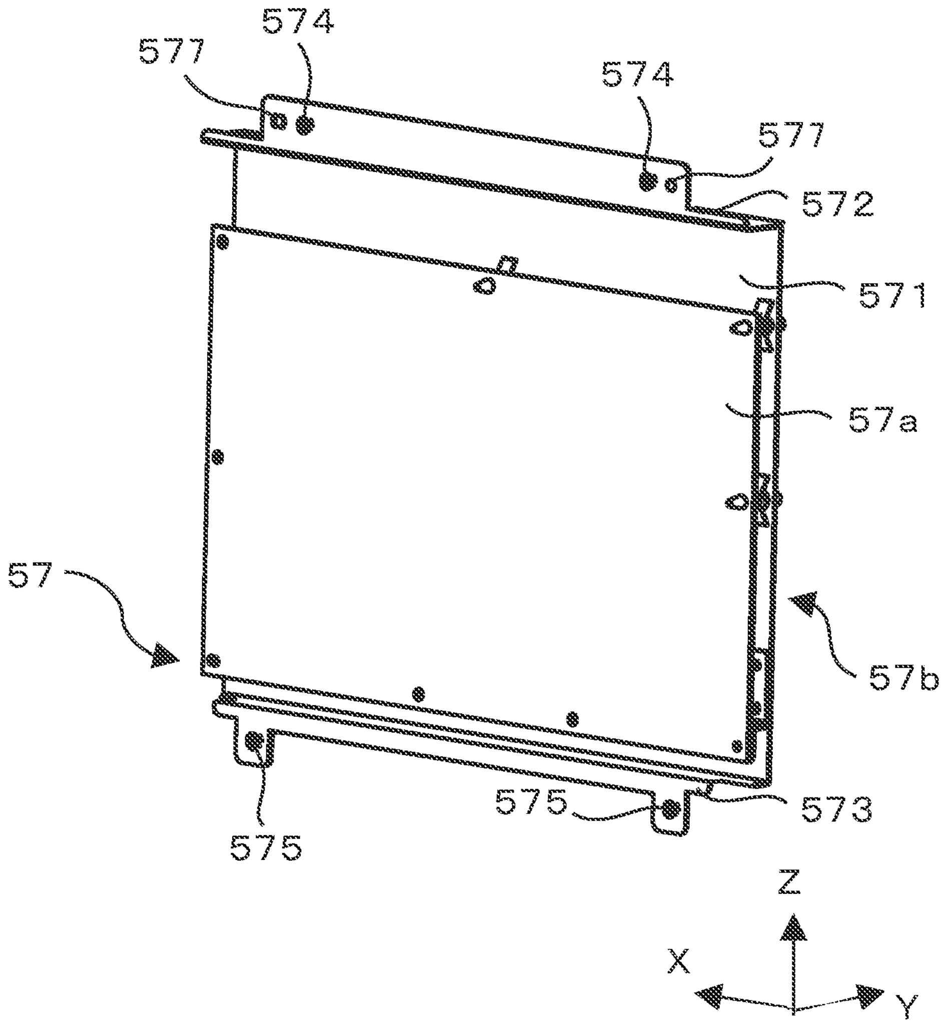
FIG. 7 is a perspective view illustrating one of high-voltage developing board units arranged in a plurality of layers.

As illustrated in FIG. 7, the high-voltage developing support plate 57*b* of the high-voltage developing board unit 57 has a holding portion 571 that holds the high-voltage developing board 57*a*, and an attaching portion 572 serving as a second flange portion for attachment to the upper stay 52 by the support plate fixing screw 62*a* (see FIG. 9). The high-voltage developing support plate 57*b* has an attaching portion 573 for attachment to the lower stay 53 by the support plate fixing screw 62*a*. The attaching portion 572 and the attaching portion 573 are erected from opposite ends of the holding portion 571 in the vertical direction intersecting the longitudinal direction of the upper stay 52, and are formed in a substantially L shape in such a way that distal ends thereof are bent in a direction away from each other. Two through holes 574 for fastening the support plate fixing screw 62*a* and two through holes 577 for positioning by being fitted onto bosses 576 (see FIG. 8) are separately formed at positions separated in the longitudinal direction at a distal end portion of the attaching portion 572 formed by being bent in a substantially L shape. On the other hand, each of through holes 575 for fastening the support plate fixing screws 62*a* is separately formed at positions separated in the longitudinal direction, respectively, at a distal end portion of the attaching portion 573 formed by being bent in a substantially L shape.

Figure 8:
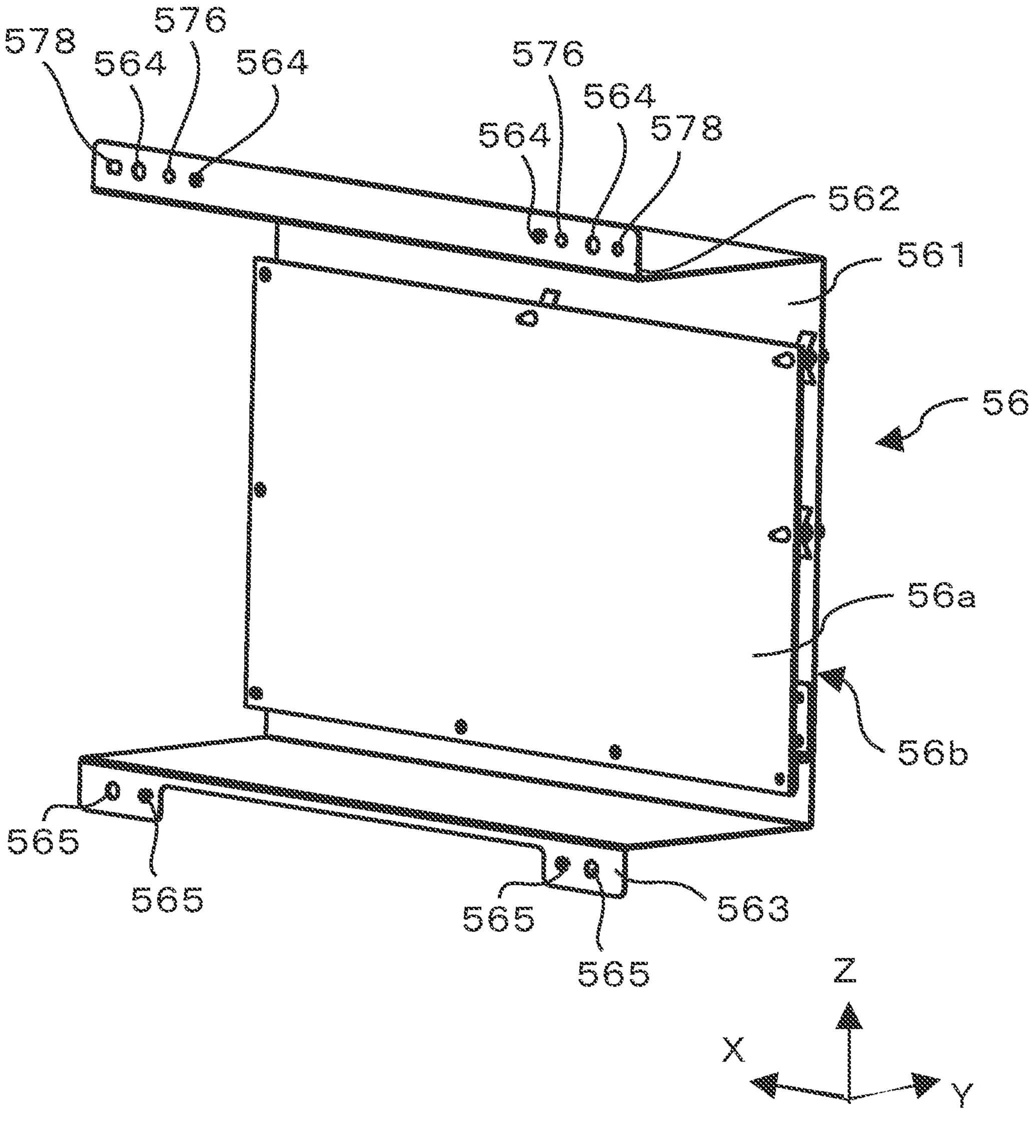
FIG. 8 is a perspective view illustrating the other of the high-voltage developing board units arranged in a plurality of layers.

As illustrated in FIG. 8, the high-voltage developing support plate 56*b* of the high-voltage developing board unit 56 has a holding portion 561 that holds the high-voltage developing board 56*a*, and an attaching portion 562 serving as the second flange portion for attachment to the upper stay 52 by the support plate fixing screws 62*a* and 62*b* (see FIG. 9). The high-voltage developing support plate 56*b* has an attaching portion 563 for attachment to the lower stay 53 by the support plate fixing screws 62*a* and 62*b*. Similarly to the attaching portion 572 and the attaching portion 573 described above, the attaching portion 562 and the attaching portion 563 are erected from opposite ends of the holding portion 561, and are formed in a substantially L shape in such a way that distal ends thereof are bent in directions away from each other. A through hole 564 for fastening the support plate fixing screws 62*a* and 62*b* and the boss 576 for positioning by being fitted into the through hole 577 (see FIG. 7) are formed at a distal end portion of the attaching portion 562. Here, as illustrated in the drawing, four through holes 564 and two bosses 576 are formed at the distal end portion of the attaching portion 562. In addition, two through holes 578 for positioning by being fitted onto bosses (not illustrated) provided on the upper stay 52 are formed at the distal end portion of the attaching portion 562. On the other hand, four through holes 565 for fastening the support plate fixing screws 62*a* and 62*b* are formed at the distal end portion of the attaching portion 563.

As illustrated in FIG. 9, the high-voltage developing support plate 57*b* and the high-voltage developing support plate 56*b* are attached to the upper stay 52 and the lower stay 53 by the support plate fixing screws 62*a* and 62*b* in a state of being positioned by the boss 576 and the through hole 577 and overlapping in multiple layers. In the present embodiment, when the image forming apparatus 100 is viewed from the back surface side (arrow Y direction), the high-voltage developing board unit 56 is attached to the back side, and the high-voltage developing board unit 57 is attached to the front side.

The holding portion 561 of the high-voltage developing board unit 56 is formed to have a width in the vertical direction that allows passage between the upper stay 52 and the lower stay 53. As the high-voltage developing board unit 56 moves toward the back side, the holding portion 561 passes between the upper stay 52 and the lower stay 53, and the distal end portions of the attaching portions 562 and 563 come into contact with the upper stay 52 and the lower stay 53, respectively. Then, the high-voltage developing board unit 56 is attached to the upper stay 52 by the support plate fixing screw 62*b* using each through hole 564 that is on the outer side among the eight through holes 564 formed in the attaching portion 562 in a state where the through hole 578 is fitted onto the boss (not illustrated) provided on the upper stay 52. In addition, the high-voltage developing board unit 56 is attached to the lower stay 53 by the support plate fixing screw 62*b* using each through hole 565 that is on the outer side among the four through holes 565 formed in the attaching portion 563.

The high-voltage developing board unit 57 is attached to the upper stay 52 and the lower stay 53 after the high-voltage developing board unit 56 is attached. That is, the holding portion 571 of the high-voltage developing board unit 57 is formed to have a width in the vertical direction that allows passage between the upper stay 52 and the lower stay 53, and is smaller than the width of the holding portion 561. As the high-voltage developing board unit 57 moves toward the back side, the holding portion 571 passes between the upper stay 52 and the lower stay 53, and the distal end portions of the attaching portions 572 and 573 come into contact with the distal end portions of the attaching portions 562 and 563 of the high-voltage developing board unit 56, respectively. At this time, the four through holes 574 of the attaching portion 572 overlap the remaining two through holes 564 that are not used for attaching the high-voltage developing board unit 56 among the through holes 564 of the attaching portion 562 described above. The through hole 577 of the attaching portion 572 is fitted onto the boss 576 of the attaching portion 562. In this manner, the through hole 577 of the attaching portion 572 and the boss 576 of the attaching portion 562 are fitted to each other, whereby the high-voltage developing board unit 57 is positioned with respect to the high-voltage developing board unit 56. Further, the two through holes 575 of the attaching portion 573 overlap the remaining two through holes 565 that are not used for attaching the high-voltage developing board unit 56 among the through holes 565 of the attaching portion 562 described above.

Then, in a state where the through hole 577 of the attaching portion 572 and the boss 576 of the attaching portion 562 are fitted to each other, the high-voltage developing board unit 57 is attached to the upper stay 52 by the support plate fixing screw 62*a* using the two through holes 574 formed in the attaching portion 572. At this time, the support plate fixing screw 62*a* is attached to the upper stay 52 through the two through holes 574 of the attaching portion 572 and the remaining two of the through holes 564 of the attaching portion 562. In addition, the high-voltage developing board unit 57 is attached to the lower stay 53 by the support plate fixing screw 62*a* using the two through holes 575 formed in the attaching portion 573. At this time, the support plate fixing screw 62*a* is attached to the lower stay 53 through the two through holes 575 of the attaching portion 573 and the remaining two of the through holes 565 of the attaching portion 563.

In this manner, the high-voltage developing board unit 56 and the high-voltage developing board unit 57 are combined and provided on the upper stay 52 and the lower stay 53 in multiple layers. Similarly, the high-voltage developing board unit 58 and the high-voltage developing board unit 59 are combined and provided on the upper stay 52 and the lower stay 53 in multiple layers.

With the above-described multilayer structure, even in a state where the electric unit 50 is attached to the rear plate 211 (see FIG. 4), the high-voltage developing board units 56 to 59 can be attached to and detached from the electric unit 50. For example, when the image forming apparatus 100 is viewed from the back surface side, the high-voltage developing board unit 57 arranged on the front side is separated from the upper stay 52 and the lower stay 53 by removing the support plate fixing screw 62*a*. Then, after the high-voltage developing board unit 57 is separated, the support plate fixing screw 62*b* is removed, so that the high-voltage developing board unit 56 is separated from the upper stay 52 and the lower stay 53. As described above, the insertion direction of the support plate fixing screws 62*a* and 62*b* is the front-rear direction (depth direction) of the image forming apparatus 100, similarly to the insertion direction of the mounting screw 61. Therefore, the electric unit 50 can be integrally attached to and detached from the rear plate 211, and the high-voltage developing support plates 56*b* to 59*b* can be individually detached from the upper stay 52 and the lower stay 53.

As described above, in the present embodiment, the high-voltage developing support plates 56*b* to 59*b* are attached to a structure formed by connecting the upper stay 52 and the lower stay 53 by the relay support plate 54*b* and the control support plate 55*b*, thereby forming the electric unit 50. The electric unit 50 is detachably provided on the rear plate 211. Therefore, once the electric unit 50 is mounted on the rear plate 211 when assembling the image forming apparatus 100, a large number of electric boards such as the relay board 54*a*, the control board 55*a*, and the high-voltage developing boards 56*a* to 59*a* are mounted at a time. That is, when assembling the image forming apparatus 100, it is easy to arrange a large number of electric boards with a small number of times. Therefore, in the present embodiment, since the time required for arranging a large number of electric boards can be shortened, the assembly efficiency of the image forming apparatus 100 can be improved. In addition, since the electric unit 50 is formed by attaching to the structure formed by the upper stay 52, the lower stay 53, and some support plates, other support plates, such an electric unit 50 is inexpensive.

In addition, the high-voltage developing support plates 56*b* to 59*b* are detachable from the upper stay 52 and the lower stay 53 in a state where the electric unit 50 is attached to the rear plate 211. As a result, since only the high-voltage developing support plates 56*b* to 59*b* can be removed and replaced, the time can be shortened even at the time of maintenance. That is, even in a case where an abnormality occurs in the high-voltage developing boards 56*a* and 58*a* on the back side, the boards can be easily replaced, so that the workability at the time of maintenance is improved.

Other Embodiments

With regard to the multilayer structure described above, for example, the high-voltage developing board unit 56 and the high-voltage developing board unit 57 provided in multiple layers on the upper stay 52 and the lower stay 53 may be integrally attachable to and detachable from the upper stay 52 and the lower stay 53 in a state of being mounted on the rear plate 211. That is, the high-voltage developing board unit 57 may be fixed to the high-voltage developing board unit 56, and the high-voltage developing board unit 56 may be attached to the upper stay 52 and the lower stay 53. In this case, after the high-voltage developing board unit 56 is removed from the upper stay 52 and the lower stay 53, the high-voltage developing board unit 57 is removed from the high-voltage developing board unit 56. By doing so, it is possible to particularly shorten the time required for maintenance of the image forming apparatus 100.

Figure 10:
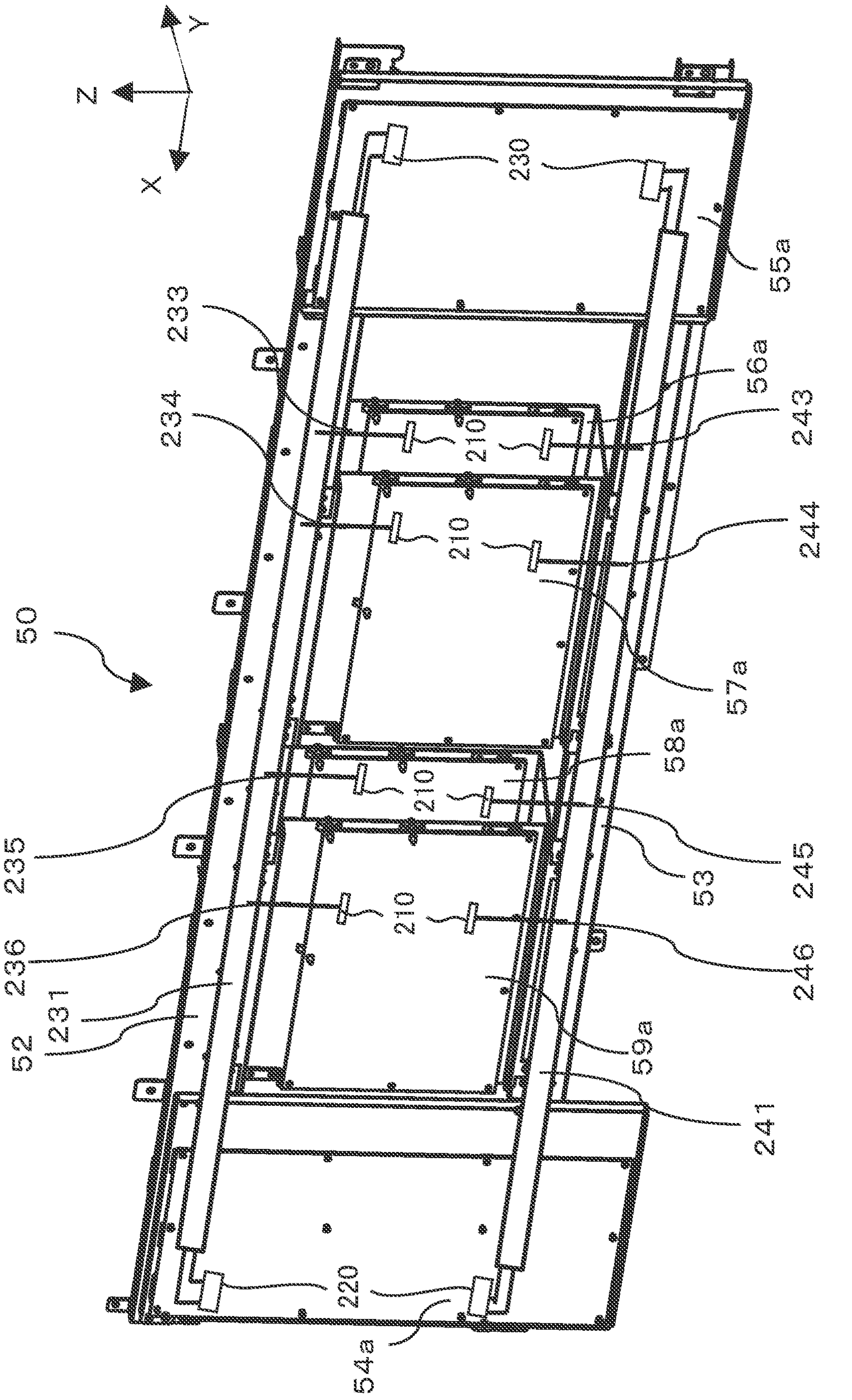
FIG. 10 is a perspective view illustrating the electric unit on which a cable has been mounted.

It is preferable that the electric unit 50 is mounted on the rear plate 211 in a state where a plurality of cables for electrically connecting the respective boards are mounted in advance. FIG. 10 is a perspective view illustrating the electric unit 50 on which the cable has been mounted, and FIG. 11 is an electric connection diagram of the electric unit 50 using the cable.

As illustrated in FIG. 10, the electric unit 50 includes a first cable bundle 231 which is a DC power supply line arranged along the upper stay 52 and a second cable bundle 241 which is a signal line arranged along the lower stay 53. A plurality of cables as described later are bundled in the first cable bundle 231 and the second cable bundle 241. As described later, a connector 220 for attaching and detaching a cable electrically connected to the control board 55*a* and the high-voltage developing boards 56*a* to 59*a* is mounted on the relay board 54*a*. As described later, a connector 230 for attaching and detaching a cable electrically connected to the relay board 54*a* and the high-voltage developing boards 56*a* to 59*a* is mounted on the control board 55*a*.

Figure 11:
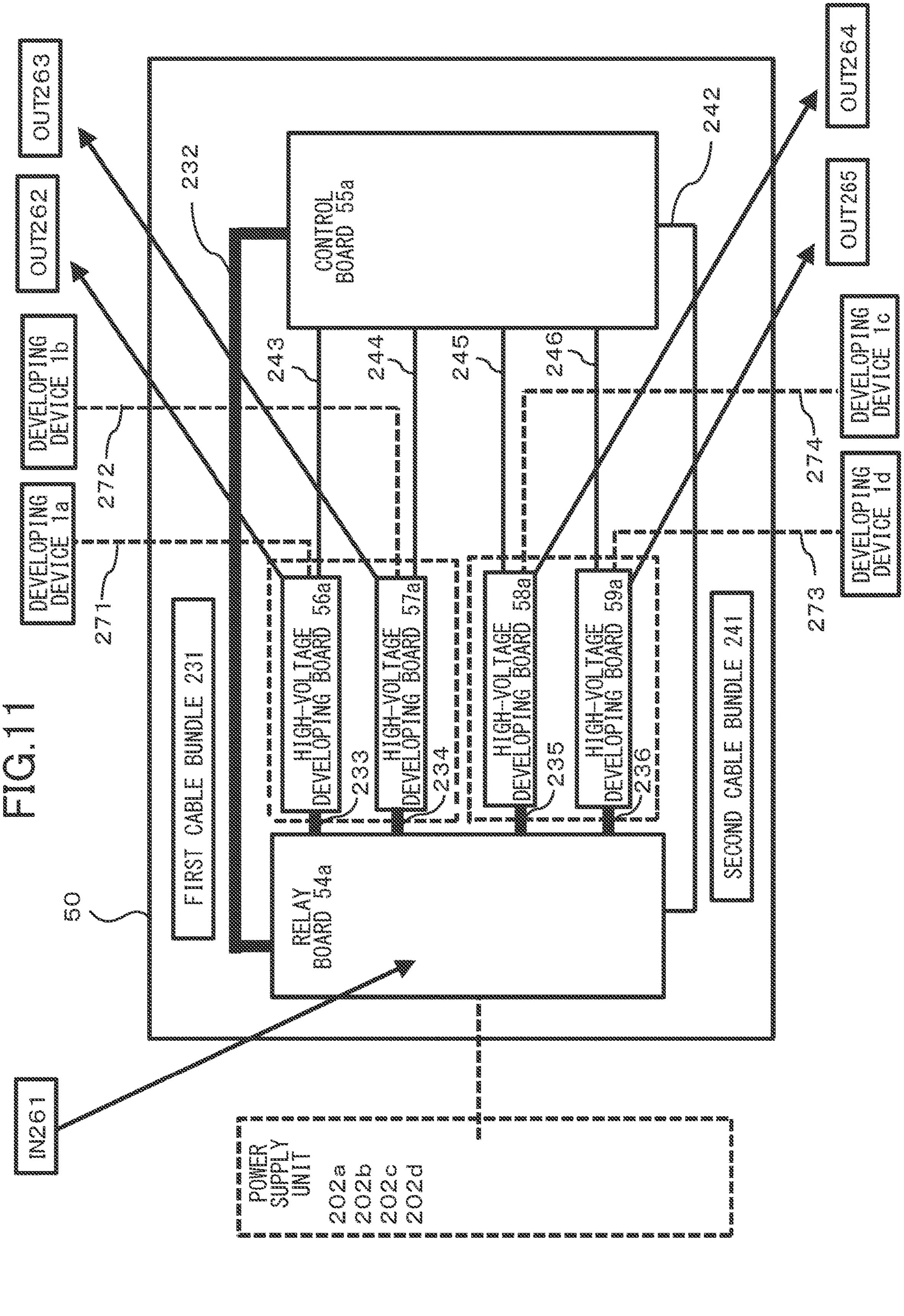
FIG. 11 is an electric connection diagram of the electric unit using the cable.

As illustrated in FIG. 11, power supplied from the power supply units 202*a* to 202*d* is once relayed to the relay board 54*a*. Then, power is supplied from the relay board 54*a* to the control board 55*a* via a power cable 232 of the first cable bundle 231 connected to the connectors 220 and 230. In addition, power is supplied from the relay board 54*a* to the high-voltage developing boards 56*a*, 57*a*, 58*a*, and 59*a* via power cables 233, 234, 235, and 236 of the first cable bundle 231 connected to the connector 210.

A control signal is transmitted and received between the control board 55*a* and the relay board 54*a* via a signal cable 242 of the second cable bundle 241. A control signal is transmitted and received between the control board 55*a* and the high-voltage developing boards 56*a*, 57*a*, 58*a*, and 59*a* via signal cables 243, 244, 245, and 246 of the second cable bundle 241.

In addition, in order to connect the high-voltage developing boards 56*a* to 59*a* and the developing devices 1*a* to 1*d*, the high-voltage developing boards 56*a* to 59*a* are provided with cables 271, 272, 273, and 274 having lengths reaching the relay connectors 227 and 228 provided on the rear plate 211.

As described above, in the electric unit 50 in which the plurality of cables are mounted in advance, it is possible to perform a test of power supply and control signal transmission/reception via each board before mounting on the rear plate 211. As illustrated in FIG. 11, power is supplied from a jig (IN261) to the relay board 54*a*, and first ends of cables connected to the high-voltage developing boards 56*a* to 59*a* are connected to jig boards (OUT262, OUT263, OUT264, and OUT265), so that the output voltages of the high-voltage developing boards 56*a* to 59*a* can be inspected. In this way, the electric unit 50 alone can be guaranteed for connection to the relay board 54*a* and the control board 55*a* for the outputs of the high-voltage developing boards 56*a* to 59*a*, for example. Therefore, at the time of assembling the image forming apparatus 100, it is sufficient if the electric unit 50 guaranteed for connection is mounted on the rear plate 211 as it is, and the test of the electric unit 50 after the mounting need not be performed, which is advantageous.

In the above-described embodiment, the mounting screws 61 are fastened to the fastening portions 52*a*, 52*b*, 52*c*, and 52*d* formed on the upper stay 52 and the fastening portions 53*a* and 53*b* (see FIG. 5) formed on the lower stay 53, so that the electric unit 50 is fixed to the rear plate 211. However, the present invention is not limited thereto, and for example, a fastening portion to which the mounting screw 61 can be fastened may be provided on the relay support plate 54*b* or the control support plate 55*b* in order to fix the electric unit 50 to the rear plate 211.

In the above-described embodiment, the configuration in which the first fixer 81 and the second fixer 91 are provided in the second casing 101*b* has been described, but a configuration in which one fixer and a cooling unit that cools a sheet after fixing are provided in the second casing 101*b* may be adopted.

In the above-described embodiment, the upper stay 52 and the lower stay 53 are each implemented by a long sheet metal member having a U-shaped cross section, but the present invention is not limited to this configuration. For example, one sheet metal integrally having the functions of the upper stay 52 and the lower stay 53 may be used. In this case, it is sufficient if the upper side of the sheet metal having a hollow-quadrangular shape that is long in the width direction of the image forming apparatus 100 is used as the upper stay 52 and the lower side thereof is used as the lower stay 53 when viewed in the thickness direction of the board. Even with this configuration, it is possible to arrange the board in the first casing 101*a* more inward than the upper stay 52 or the lower stay 53 is, and it is possible to suppress an increase in size of the first casing 101*a* in the depth direction (arrow Y direction).

In the above-described embodiment, the configuration in which the high-voltage developing board units 56 and 58 are fixed to both the upper stay 52 and the lower stay 53 so as to be positioned on the inner side of the first casing 101*a* has been described, but the present invention is not limited to this configuration. For example, the lower stay 53 may be positioned in the first casing 101*a* more inward than the upper stay 52 is in the depth direction (the front-rear direction and a Y direction) of the first casing 101*a*. Conversely, the upper stay 52 may be positioned in the first casing 101*a* more inward than the lower stay 53 is. With this configuration, the high-voltage developing board units 56 and 58 are positioned in the first casing 101*a* more inward than at least one of the upper stay 52 or the lower stay 53 is, whereby an increase in size of the first casing 101*a* in the depth direction (arrow Y direction) can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-117130, filed Jul. 15, 2021, which is hereby incorporated by reference herein in its entirety.

What is claimed is:

1. An image forming apparatus for forming an image on a recording material, the image forming apparatus comprising:

- a plurality of photosensitive members;
- a support frame configured to support the plurality of photosensitive members; and
- an electric unit secured to the support frame, and including:
  - a first electric board;
  - a second electric board;
  - a first supporting portion extending in an arrangement direction of the plurality of photosensitive members;
  - a second supporting portion extending in the arrangement direction; and
  - a first-second-electric board holding portion configured to hold the first electric board and the second electric board and bridging between the first supporting portion and the second supporting portion, the first-second-electric board holding portion including a first-electric-board holding portion configured to hold the first electric board and a second-electric board holding portion configured to hold the second electric board, the first electric board and the second electric board overlapping in an orthogonal direction, which is orthogonal to the arrangement direction and a vertical direction, wherein the first electric board is positioned in the image forming apparatus more inwardly than at least one of the first supporting portion or the second supporting portion in the orthogonal direction.

2. The image forming apparatus according to claim 1, wherein the second supporting portion is positioned in the image forming apparatus more inwardly than the first supporting portion in the orthogonal direction.

3. The image forming apparatus according to claim 1, wherein the first electric board is positioned between the first supporting portion and the photosensitive member in the orthogonal direction.

4. The image forming apparatus according to claim 1, wherein the electric unit is:

secured to the support frame on a rear side of the image forming apparatus; and integrally attachable to and detachable from the support frame.

5. The image forming apparatus according to claim 1, wherein:

the first supporting portion includes a first flange portion secured to the support frame by a first screw, the first-electric-board holding portion includes a second flange portion secured to the first supporting portion by a second screw, and an insertion direction of the first screw and the second screw is parallel to the orthogonal direction.

6. The image forming apparatus according to claim 1, wherein the electric unit further includes a plurality of cables electrically connecting the first electric board and the second electric board.

7. The image forming apparatus according to claim 1, further comprising:

a first developing unit configured to form a toner image on a first photosensitive member, which is one photosensitive member among the plurality of photosensitive members; and a second developing unit configured to form a toner image on a second photosensitive member, which is another photosensitive member, among the plurality of photosensitive members different from the one photosensitive member, wherein the first electric board is a high-voltage board that supplies a voltage to the first developing unit, and wherein the second electric board is another high-voltage board that supplies a voltage to the second developing unit.

8. An image forming apparatus for forming an image on a recording material, the image forming apparatus comprising:

a plurality of photosensitive members;

a support frame configured to support the plurality of photosensitive members; and an electric unit secured to the support frame, and including:

a first electric board;

a second electric board;

a third electric board;

a first supporting portion extending in an arrangement direction of the plurality of photosensitive members;

a second supporting portion extending in the arrangement direction;

a first-second electric board holding portion configured to hold the first electric board and the second electric board and bridging between the first supporting portion and the second supporting portion;

a third-electric-board holding portion configured to hold the third electric board and bridging and disposed between the first supporting portion and the second supporting portion, and the third-electric-board holding portion is arranged to not overlap with the first-second electric board holding portion as the image forming apparatus is viewed from a back surface side, wherein the first electric board is positioned in the image forming apparatus more inwardly than at least one of the first supporting portion or the second supporting portion in an orthogonal direction, which is orthogonal to the arrangement direction and a vertical direction.

9. The image forming apparatus according to claim 8, wherein the third-electrical-board holding portion is attachable to and detachable from the first supporting portion and the second supporting portion, in a state where the first supporting portion and the second supporting portion are secured to the support frame.

10. The image forming apparatus according to claim 8, wherein:

the electric unit further includes:

a fourth electric board; and a fourth-electric-board holding portion configured to hold the fourth electric board, and bridging and disposed between the first supporting portion and the second supporting portion, and the first-second electric board holding portion is arranged between the third-electric-board holding portion and the fourth-electric-board holding portion in the arrangement direction.

11. The image forming apparatus according to claim 10, wherein:

the third electric board is a relay board that relays a voltage supplied from outside to the first electric board and the second electric board, and the second electric board is a control board that controls the third electric board and the fourth electric board.

12. The image forming apparatus according to claim 11, wherein the electric unit further includes a plurality of cables electrically connecting the first electric board, the second electric board, the third electric board, and the fourth electric board.

13. The image forming apparatus according to claim 10, further comprising:

a first developing unit configured to form a toner image on a first photosensitive member, which is a first photosensitive member among the plurality of photosensitive members;

a second developing unit configured to form a toner image on a second photosensitive member, which is a second photosensitive member among the plurality of photosensitive members different from the first photosensitive member;

a third developing unit configured to form a toner image on a third photosensitive member, which is a third photosensitive member among the plurality of photosensitive members different from the first and second photosensitive members; and a fourth developing unit configured to form a toner image on a fourth photosensitive member, which is a fourth photosensitive member among the plurality of photosensitive members different from the first, second, and third photosensitive members, wherein the electric unit further includes a fifth electric board, a sixth electric board, and a fifth-sixth-electric board holding portion configured to hold the fifth electric board and the sixth electric board, and bridging between the first supporting portion and the second supporting portion, wherein the fifth-sixth-electric board holding portion is provided between the first-second-electric board holding portion and the third-electric-board holding portion in the arrangement direction, wherein the fifth electric board is a high-voltage board that supplies a voltage to the third developing unit, and wherein the sixth electric board is another high-voltage board that supplies a voltage to the fourth developing unit.

14. The image forming apparatus according to claim 13, wherein the first developing unit, the second developing unit, the third developing unit, and the fourth developing unit respectively develop the first photosensitive member, the second photosensitive member, the third photosensitive member, and the fourth photosensitive member with toners of different colors.

* * * * *